United States Patent Office 3,091,572
Patented May 28, 1963

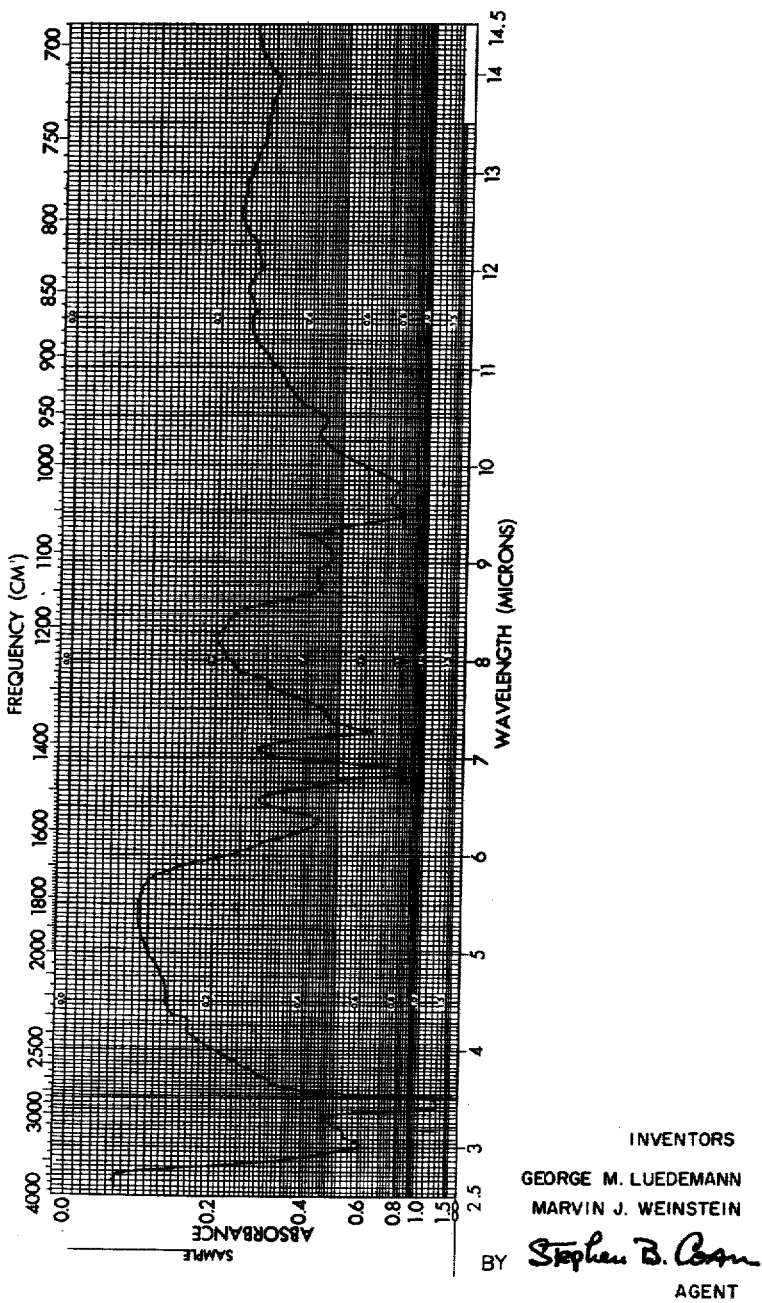

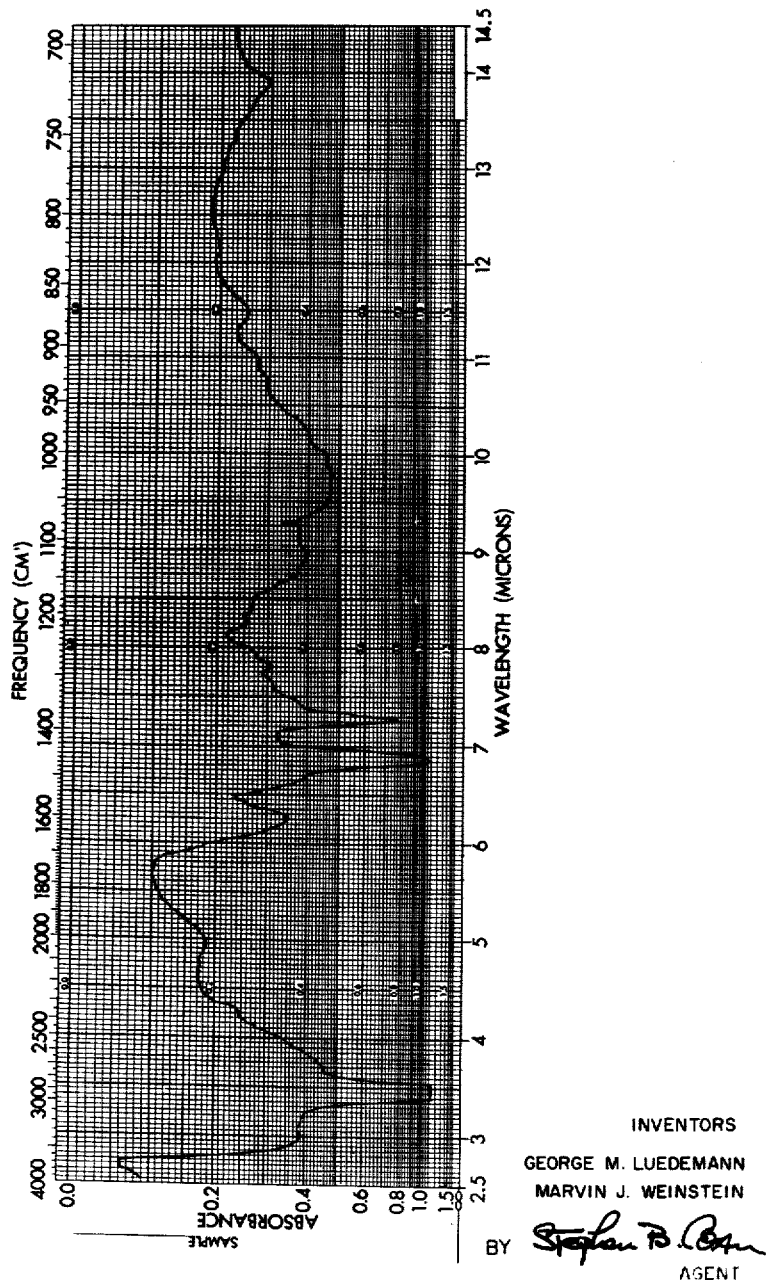

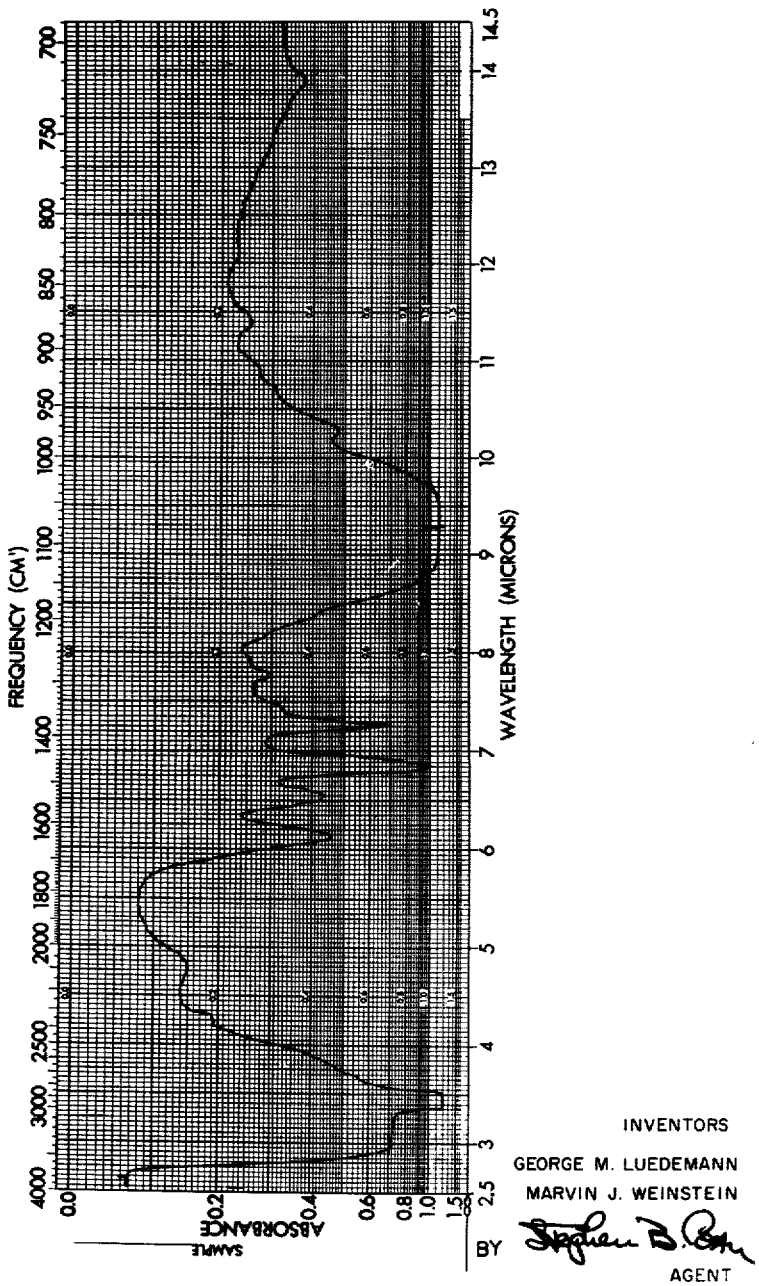

3,091,572
GENTAMYCIN AND METHOD OF PRODUCTION
George M. Luedemann, Bloomfield, and Marvin J. Weinstein, East Brunswick, N.J., assignors to Schering Corporation, Bloomfield, N.J., a corporation of New Jersey
Filed July 16, 1962, Ser. No. 211,153
14 Claims. (Cl. 167—65)

This invention relates to new and useful antibiotics and to methods for their manufacture. More particularly, this invention relates to a new antibiotic, its salts, processes for the production thereof, methods for concentrating, purifying and isolating same (and to antibiotics co-produced therewith). In its free form, the new antibiotic is called gentamycin.

The antibiotic, gentamycin, is formed by cultivation under controlled conditions of hitherto undescribed species of the genus Micromonospora of the order Actinomycetales.

THE MICROORGANISM

The microorganisms useful for the preparation of gentamycin, and its co-produced antibiotics, are species of Micromonospora. Cultures of the living organisms have been deposited and made a part of the stock culture collection of the United States Department of Agriculture, Northern Utilization Research and Development Division, Peoria, Illinois, from which they are available under their respective NRRL identifications. One of the species, designated as *Micromonospora purpurea* n. sp., hereinafter called *M. purpurea*, has been assigned the number NRRL 2953 and was originally isolated from a sample of park loam in Syracuse, New York. The other novel species of this invention has been designated as *Micromonospora echinospora* n. sp., hereinafter called *M. echinospora*. This latter species was isolated from a mud sample in Jamesville, New York, and has been assigned the number NRRL 2985.

*M. purpurea* is characterized by a fine mycelium averaging $0.5\mu$ in diameter; does not produce a true aerial mycelium; produces single spores which average $1.0\mu$ in diameter at the ends of simple sporophores; is non-acid-fast; gram positive; digests certain types of protein and starch; is aerobic, grows well between 22–37° C. but not at 46° C. or above. The colony form and orange color on most rich organic agar media are typical. On other agar media low in nitrogen, the color of the colony is reddish purpose to purple. While this reddish purple pigment is characteristic of the fresh soil isolate, it may be temporarily or permanently lost in strains obtained by repeated isolation and transfer.

*M. echinospora*, when grown in a medium consisting of 0.05% yeast extract (Difco), 1% dextrose, 0.1% calcium carbonate in distilled water and incubated on a rotary shaker at 28° C. for 30 days, is characterized by a long, branched, regular, non-esptate mycelium approximately $0.5\mu$ in diameter. The growth is purple in color. Pores are abundantly produced singly as terminal enlargements of the hyphal tip. Both spores and sporophores are characteristically clavate. The mature spore is somewhat spherical having a diameter of about 1.0–1.5$\mu$. By phase contrast microscopy ($\times 1000$) the spores appear rough-walled. Electronmicrographs indicate the roughness to be due to spines which regularly protrude beyond the spore surface occasionally attaining a length of $0.2\mu$. In this broth medium under the aforementioned conditions, *M. purpurea* does not appear to produce spores.

*M. echinospora* digests certain types of protein and starch, is aerobic and also grows well in the range of 22–37° C. but not above about 50° C. When grown in a medium consisting of 0.3% beef extract, 0.5% tryptose, 0.1% dextrose, 2.4% soluble starch, 0.5% yeast extract, 0.1% calcium carbonate and 1.5% agar, all in tap water, shaking at 28° C. for 30 days, a purple diffusible pigment may be produced. This diffusible pigment characteristic may be temporarily lost in strains obtained by repeated isolation and transfer. *M. purpurea* on the immediately aforedescribed medium generally does not produce such a diffusible pigment.

The data of Table I, which follows, compare the taxonomy of *M. purpurea* and *M. echinospora* with other species of Micromonospora. The colony observations were made after 14 days incubation at 24–26° C. in the designated media. In describing the color formations the following system and references are employed: The color designation consists of two designates. The first is a color name taken from the "Descriptive Color Name Dictionary," by Taylor, Knoche and Granville, published by the Container Corporation of America, 1950 (U.S.A.), with a color chip number corresponding to the color name; said chip number taken from the "Color Harmony Manual," 4th edition, 1958, published by the Container Corporation of America, U.S.A. The second designate, consists of a color-name nad number which refers to the synonym or near synonym found in the National Bureau of Standards, Circular 553, November 1, 1955 (U.S.A.). The NZ Amine referred to in Table I is obtainable from Sheffield Chemical Co., Norwich, New York.

*Table I*

COMPARATIVE TAXONOMY OF MICROMONOSPORA SPECIES

[Medium: 3% NZ Amine type A, 1% dextrose, 1.5% agar]

| Organism | Observations | |
|---|---|---|
| | Macroscopic | Microscopic |
| *M. purpurea* NRRL 2953. | No aerial mycellium, colony raised, convolute abundant growth, waxy, no diffusible pigment. Surface: terra cotta-g5PE; brown-55. Reverse: russet-5PG; strong brown-55. | Mycelium long, branched, regular, non-septate, $0.5\mu$ in diameter. Sporophores single, spores borne terminally, spores spherical to ellipsoidal, $1.0\mu$ in diameter. |
| *M. echinospora* NRRL 2985. | No aerial mycelium, colony raised, crenate-convolute good growth, waxy, slight amber diffusible pigment. Surface color: deep red-brown-g6½PL; dark reddish brown-44. Reverse: russet-5PG; strong brown-55. | Mycelium long, branched, regular, non-septate, $0.5\mu$ in diameter. No spores. |
| *M. chalcea* ATCC 12452. | No aerial mycelium, colony raised, ridged, fair growth, waxy, no diffusible pigment. Surface: copper brown-g5PI; strong brown-55. Reverse: russet brown-g4PI; strong brown-55. | Mycelium long, branched, regular, non-septate, $0.5\mu$ in diameter. Spores abundant, borne singly and in clusters, spores spherical to ellipsoidal, $1.0\mu$ in diameter. |
| *M. fusca* NRRL B-043. | No aerial mycelium, colony raised, rough granular, good growth, dull, very slight yellowish brown diffusible pigment. Surface: terra cotta-g5PE; strong brown-55. Reverse: russet-g5PG; strong brown-55. | Mycelium irregular, many polymorphic elements present, 0.5–2.0$\mu$ in diameter, olive brown in color. True spores $1.0\mu$ in diameter, grading into polymorphic forms 0.5–2.0$\mu$ in diameter. |
| *M. sp.* ATCC 10026. | No aerial mycelium, colony raised, dense granular, dry, good growth. Surface: periphery: russet orange-g4PC; strong orange-50. Center: chocolate brown-g4PN; dark grayish brown-62. Reverse: dark spice brown-g4PL; dark brown-59. | Mycelium of two types: long and regular, short and irregular, producing many polymorphic elements, 0.8–2.0$\mu$ in diameter. True spores abundant, borne in clusters, $1.0\mu$ in diameter, spherical to ellipsoidal. |

Although the invention as set forth herein describes the use of M. purpurea and M. echinospora and the antibiotics produced thereby, it is to be understood that the invention is not so limited but includes mutants produced from the described organisms by mutating agents such as high frequency radiation (X-ray, ultraviolet), actinophages and nitrogen mustards.

For isolating the microorganisms, a portion of the soil sample is shaken in sterile distilled water and after making suitable dilutions, the suspension is plated on screen agar medium. A useable medium contains 1% glycerol, 0.2% sodium nitrate, 0.1% dipotassium hydrogen phosphate, 0.05% magnesium sulfate, 0.05% potassium chloride, 0.001% ferrous sulfate, 1.5% agar, all in distilled water. A preferred medium contains 0.5% tryptose, 2.0% soluble starch, 0.3% calcium propionate and 2.0% agar all in distilled water.

*Klebsiella pneumoniae* and *Mycobacterium smegmatis*. Antibiotic activity against the same organisms is observed after growth in submerged fermentation for 96 hours in an aqueous medium such as one containing 1% yeast extract, 1% cerelose and 0.1% calcium carbonate or one containing the components described earlier in this paragraph. In Table II, which follows, is shown data relative to colonies of M. purpurea incubated for 14 days at 26° on various media. Comparison is made against other species of Micromonospora; the data for such other species being taken from "Bergey's Manual of Determinative Bacteriology," 7th edition, 1957, published by The Williams and Wilkins Company, Baltimore, Maryland. M. echinospora exhibits the same properties as does M. purpurea with regard to action upon gelatin, milk, sucrose, starch, cellulose and nitrates.

Table II
COLONY COMPARISON OF MICROMONOSPORA SPECIES ON VARIOUS MEDIA

| Media | M. purpurea NRRL 2953 | M. chalcea | M. fusca | M. parva | M. globosa | M. coerulea |
|---|---|---|---|---|---|---|
| Glucose asparagine agar. | Growth, fair. Color: brite peach-g5IA; moderate reddish orange-37. No soluble pigment. No dark colored spore layer detected. Aerial mycelium none. | Growth, vigorous. Pale pink to deep orange. No soluble pigment. Brownish to greenish black spore layer. Aerial mycelium none. | Growth, vigorous. Orange changing to deep brown. Soluble brown pigment. Grayish to brownish black spore layer. | Growth, poor. | Growth, poor. | Growth, poor. |
| Gelatin | Weak liquefaction | Liquefaction | Weak liquefaction | Liquefaction | Liquefaction | Rapid liquefaction. |
| Milk | Slowly digested | Peptonized; occasionally coagulated. | Slowly digested; not coagulated. | Unchanged | Coagulated, peptonized. | May be coagulated; digestion very slight. |
| Sucrose | Utilized | Inverted | Inverted | Not inverted | Inverted | Inverted. |
| Starch | Hydrolyzed | Hydrolyzed | Hydrolyzed | Hydrolyzed | Hydrolyzed | Hydrolyzed. |
| Cellulose | Attacked to slight extent | Rapidly decomposed | Attacked to slight extent. | Not decomposed. | Not decomposed. | Not decomposed. |
| Nitrate reduction. | Nitrate reduction variable. | Nitrites produced from nitrates. | Nitrate reduction variable. | No reduction | Nitrites produced from nitrates. | No reduction. |
| Temperature | Good Growth 22°–37° C., no growth 47° C. | Optimum growth between 30–35° C. | | | | |
| Aerobic or anaerobic growth. | Aerobic | Aerobic | Aerobic | Aerobic | Aerobic | Aerobic. |

The cultures are tested for antibiotic activity by first growing in the following medium for up to 60 days at 26° C.: 0.3% beef extract, 0.5% tryptose, 0.1% dextrose, 2.4% soluble starch, 0.5% yeast extract, 1.5% agar, all in tap water. The whole aqueous agar is then extracted with butanol and the butanol-water extract is concentrated. Although the antibiotic is only minimally soluble in butanol, sufficient antibiotic is extracted by the butanol-water mixture to provide a concentrate, which, by disc test, inhibits the growth of *Staphylococcus aureus*, *Bacillus subtilis*, *Escherichia coli*, *Pseudomonas aeruginosa*, In Table IIIA and IIIB, which follow, a comparison of the colony characteristics of M. purpurea is made with those exhibited by three presently available species of Micromonospora. The media employed are those commonly used for Streptomyces determinations. The color of the colony is identified by two designates according to the system employed for the data in Tables IA and IB. The characteristics of M. echinospora are specifically set forth in Table IIIA. The characteristics of this organism as evidenced on the media of Table IIIB, are the same as those shown for M. purpurea.

Table IIIA
LABORATORY COMPARISON OF M. PURPUREA VITH OTHER MICROMONOSPORO ON VARIOUS MEDIA

| Medium | M. purpurea NRRL 2953 | M. echinospora NRRL 2985 | M. chalcea ATCC 12452 | M. fusca NRRL B-943 | M. sp. ATCC 10026 |
|---|---|---|---|---|---|
| Bennett's agar | Growth, good. Color: terra cotta-m5PE; brownish orange-54. | Growth, good. Color: deep maroon-g7½PL; dark grayish reddish brown-47. | Growth, good. Color: Periphery; terra cotta-g5PE; strong brown-55m. Center; chocolate brown-g4PN; dark brown-59. | Growth, good. Color: terra cotta-g5PE; strong brown-55. | Growth, good. Color: Periphery; terra cotta-g5PE; strong brown-55. Center; clove brown-3PL; dark yellowish brown-78. |
| Emerson's agar | Growth, good. Color: burnt orange-g5NC; strong reddish orange-35. | Growth, good. Color: tile red-g5NE; strong brown-55. | Growth, good. Color: bitter-sweet-g5PC; deep orange-51. | Growth, good. Color: tangerine-g5PA; vivid orange. | Growth, good. Color: oak brown-g4PI; strong brown-55. |
| Tomato paste oatmeal agar. | Growth, good. Color: burnt orange-g5NC; strong reddish orange-35. | Growth, fair. Color: dusty orange-g4LC; moderate orange-53. | Growth, good. Color: Periphery; terra cotta-g5PE; strong brown-55. Center; chocolate brown-4PN; dark brown-59. | Growth, fair. Color: brite peach-g5IA; moderate reddish orange-37. | Growth, fair. Color: brite peach-g5IA; moderate reddish orange-37. |
| Glucose asparagine agar. | Growth, fair. Color: brite peach-g5IA; moderate reddish orange-37. | Growth, poor. | Growth, good. Color: terra cotta-g5PE; strong brown-55. | Growth, fair. Color: sun orange-g5LA; strong orange-50. | Growth, poor. |
| Glucose yeast extract agar. | Growth, good. Color: deep brown-g4PL; dark brown-59. | Growth, good. Crenate-granular. Color: maple-g4LE; light brown-57. | Growth, good. Color: deep brown-g4PL; dark brown-59. | Growth, good. Color: terra cotta-g5PE; strong brown-55. | Growth, good. Color: oak brown-g4PI; strong brown-55. |

Table IIIB
LABORATORY COMPARISON OF M. PURPUREA WITH OTHER MICROMONOSPORA ON VARIOUS MEDIA

| Medium | M. purpurea NRRL 2953 | M. chalcea ATCC 12452 | M. fusca NRRL B-943 | M. sp. ATCC 10026 |
|---|---|---|---|---|
| Potato slice | Growth, poor | Growth, good. Color: barn red-g6PG; moderate reddish brown-43. | Growth, good. Color: bitter-sweet-g5PC; deep orange-51. | Growth, good. Color: bitter-sweet-g5PC; deep orange-51. |
| Carrot slice | ___do___ | Growth, good. Color: chocolate brown-g4PN; dark brown-59. | Growth, poor | Growth, fair. Color: burnt orange-g5NC; strong reddish orange-35. |
| Sucrose nitrate agar (Czapek's agar). | Poor | No growth | No growth | No growth. |
| Tyrosine agar. Observations at 2, 7 and 14 days (after Gordon & Smith J. Bact. 69:147). | Growth, fair. Color: no diffusible pigment. | Growth, good. Color: black diffusible pigment. | Growth, fair. Color: no diffusible pigment. | Growth, poor. Color: no diffusible pigment. |
| Peptone iron agar. Observations at 2, 7, and 14 days. | Growth, good. Color: no reaction. | Growth, good. Color: no reaction. | Growth, fair. Color: no reaction. | Growth, fair. Color: no reaction. |
| Bromo cresol purple milk | Growth, good digestion. Color: no pH change. | Growth, good digestion. Color: no pH change. | Growth, fair digestion. Color: no pH change. | Growth, good digestion. Color: no pH change. |

*M. purpurea* and *M. echinospora* are capable of utilizing various carbon and nitrogen sources. In Table IV, carbon utilization is compared with other Micromonospora species by a visual estimate of growth on agar plates in a medium consisting of 0.5% yeast extract, Difco (Difco Laboratories Inc., Detroit, Michigan), 1% carbohydrate and 1.5% agar all in distilled water. In Table V, nitrogen utilization is compared with other Micromonospora species by visual estimate of growth on agar plates in a medium consisting of 1% glucose, 1.5% agar, nitrogen source concentration as indicated, all in distilled water. The visual estimates of growth and color observations in Tables IV and V for *M. purpurea* are the same as those observed for *M. echinospora* with the exception that *M. echinospora* exhibits good growth in the carbohydrate medium containing rhamnose. The color code in Table V is in conformity with that set forth for Tables IA and IB.

Table IV
CARBOHYDRATE UTILIZATION

| Carbohydrate | M. purpurea NRRL 2953 | M. chalcea ATCC 12452 | M. fusca NRRL B-943 | M. sp. ATCC 10026 |
|---|---|---|---|---|
| Arbinose | Good | Good | Good | Good. |
| Cellulose | Poor | Poor | Poor | Poor. |
| Glucose | Good | Good | Good | Good. |
| Galactose | Fair | ___do___ | ___do___ | Fair. |
| Lactose | Poor | Fair | Poor | Poor. |
| Levulose | ___do___ | ___do___ | ___do___ | Do. |
| Mannose | Fair | Good | Good | Good. |
| Raffinose | Poor | Poor | Poor | Poor. |
| Rhamnose | ___do___ | ___do___ | ___do___ | Do. |
| Starch | Good | Good | Good | Good. |
| Sucrose | ___do___ | ___do___ | ___do___ | Do. |
| Xylose | ___do___ | ___do___ | Poor | Poor. |
| Inositol | Poor | Poor | ___do___ | Do. |
| Mannitol | ___do___ | ___do___ | Good | Good. |
| Sorbitol | ___do___ | ___do___ | Poor | Poor. |
| Control, 0.5% yeast extract. | ___do___ | ___do___ | ___do___ | Do. |

Heretofore, we have described two species, namely, *M. purpurea* and *M. echinospora*, which produce the substances gentamycin and its co-produced antibiotics. We have stated that we envision as within our inventive concept the use of mutants of these species for the production of antibiotics. Also included within our inventive concept are variants of these species which differ from the described species in a minor fashion such as a morphological or biochemical property. In particular, we include two variants of *M. echinospora*, said variants being identified as *M. echinospora* var. *ferruginea* and *M. echinospora* var. *pallida*, respectively. Cultures of these variants have also been deposited and made a part of the stock culture collection of the United States Department of Agriculture, Northern Utilization Research and Development Division, Peoria, Illinois, from which they are available under their respective NRRL identifications; namely, NRRL 2995 for *M. echinospora* var. *ferruginea* and NRRL 2996 for *M. echinospora* var. *pallida*. These variants are taxonomically the same as *M. echinospora* described heretofore but with the following differences:

*M. echinospora* var. *ferruginea* does not reduce nitrates, grows well on ribose (both *M. echinospora* and *M. echinospora* var. *pallida* grow poorly on this pentose), colonies tend to be reddish or yellowish brown in color (occasionally turning reddish to purplish-brown on aging). Maroon pigments are occasionally encountered in the mycelium. Sporulation is generally poor, however, on some media (for example, tomato paste-oatmeal agar plus 0.1% sodium carbonate) in old cultures, both spore and sporophores have been found possessing the characteristic roughened wall. On this medium and on Bennett's agar growth is good; plicate with color being red mahogany—g6½PI; deep reddish brown—41.

*M. echinospora* var. *pallida* fails to produce a dark purple mycelial pigmentation on agar medium. Colony color on most agar media varies from pale orange to light tan. On Bennett's agar and tomato paste-oatmeal agar +0.1% sodium carbonate, growth is good, plicate. Colony color on the former medium is apricot—g4GA; light orange—52. In the latter medium the periphery is of the aforementioned color with the center turning black.

Table V
UTILIZATION OF NITROGEN SOURCES

| Nitrogen source plus 1% glucose | M. purpurea NRRL 2953 | M. chalcea ATCC 12452 | M. fusca NRRL B-943 | M. sp. ATCC 10026 |
|---|---|---|---|---|
| 0.5% Difco yeast extract | Growth, good. Color: tile red-g5NE; strong brown-55. | Growth, good. Color: barn red-g6PG; moderate reddish brown-43. | Growth, good. Color: russet orange-g4PC; strong orange-50. | Growth, good. Color: bitter-sweet-g5PC; deep orange-51. |
| 1.0% NZ amine type A | Growth, good. Color: burgundy-g7½PL; dark grayish reddish brown-47. | Growth, good. Color: henna-g5PG; strong brown-55. | Growth, good. Color: henna-g5PG; strong brown-55. | Growth, good. Color: terra cotta-g5PE; strong brown-55. |
| 1% asparagine | Growth, fair. Color: burgundy-g7½PL; dark grayish reddish brown-47. | Growth, fair. Color: clove brown-g3PL; dark yellowish brown-78. | Growth, poor | Growth, poor. |
| 1% glutamic acid | ___do___ | ___do___ | ___do___ | Do. |
| 1% sodium nitrate | Poor to no growth | No growth | No growth | No growth. |
| 1% ammonium nitrate | ___do___ | ___do___ | ___do___ | Do. |

These variants are equivalent to other species described herein for the purpose of producing antibiotics in general and gentamycin in particular. Thus, throughout this specification and claims, unless otherwise indicated by specific differentiation, the terms M. purpurea and M. echinospora are inclusive of the species and mutants and variants thereof.

THE ANTIBIOTIC

M. purpurea and M. echinospora and variants thereof, by the fermentation methods described herein, produce a mixture of antibiotics. After the fermentation, when the mycelium is separated from the broth, the antibiotics are found primarily in the mycelium and are separated therefrom by the methods described herein. The antibiotic, with which this invention is primarily concerned has been assigned the name gentamycin which represents the major component. The other components, as determined by paper chromatographic studies, comprise essentially two antibiotic substances. These co-produced substances are sometimes referred to as BA–3 (fraction A) and BA–3 (fraction B). In the following discussion and examples which pertain to the production and isolation of the antibiotics, the transformations effected starting with M. purpurea are equally applicable to M. echinospora and its aforedescribed variants. It is thus to be understood that M. echinospora and variants thereof, may be substituted for M. purpurea wherever the latter is utilized, provided the substitution is made consistently throughout.

In order to form gentamycin, M. purpurea is grown at a suitable temperature of about 25° C. to 40° C., preferably 30° C., under submerged aerobic conditions in an aqueous nutrient medium containing an assimilable carbon and nitrogen source. Suitable carbon sources include carbohydrates such as starch, dextrin, sugars, etc. Suitable nitrogen sources include both organic and inorganic nitrogen, preferably the former, such as soybean meal, peptones and the like.

The fermentation is carried out for about 24 to 48 hours at a pH in the range of about 6 to 8. At about the end of this period, peak antibiotic production has been attained. Since most of the activity resides in the mycelium, the fermentation broth is filtered and the filtrate is discarded. Gentamycin is separated from the mycelium by acid extraction with mineral acid at a pH of about 2. The acid extracts are neutralized to a pH of about 6 and may be either passed through an ion exchange resin, preferably of the IRC–50 Amberlite type; or precipitated by formation of an insoluble salt, e.g. helianthate, Reineckate, dodecylbenzene sulfonate (Santomerse S). Examples of the Amberlite type resins employed herein, both anionic and cationic exchange, are found in the Handbook of Chemistry and Physics, 42nd edition, Chemical Rubber Publishing Co., Cleveland, Ohio (1960).

When the resin procedure is employed, the aforementioned solution of the antibiotic at pH 6 is passed through the ion exchange resin and the antibiotic is eluted from the resin with dilute sulfuric acid. The eluate is made alkaline to a pH of about 10 with sodium hydroxide. Upon the addition of acetone, inorganic salts are precipitated. The supernatant liquor is adjusted to pH 4.5 and concentrated in vacuo to give a concentrated solution of gentamycin sulfate. Methanol is added to this solution and crude gentamycin sulfate is precipitated. When the insoluble salt method is utilized, the neutralized mycelial extract is treated with Santomerse S and the precipitated salts removed by filtration. The precipitate is washed with water and dissolved in methanol. The methanolic solution is filtered and then passed through an anionic exchange resin, for example, of the Amberlite IRA–401 S type. The eluate is concentrated, adjusted to pH 4.5 with sulfuric acid resulting in a concentrated solution of gentamycin sulfate. The sulfate is obtained by adding methanol to the solution and separating the precipitated salt by filtration.

Gentamycin is a moderately strong base which readily forms salts with strong organic and inorganic acids. In general, the mineral acid salts, such as that formed with hydrochloric acid, are completely water soluble. The salts are obtained by concentration of their aqueous solution and precipitation with a water miscible organic solvent, preferably a lower aliphatic alcohol or ketone.

The fermentation of M. purpurea as described herein produces the antibiotic gentamycin along with other antibiotic products, the latter in minor quantities. Gentamycin, as isolated by the resin technique, is further separated from its co-produced antibiotics preferably by fractional precipitation of its Stantomerse S (sodium dodecylbenzene sulfonate) salt. Gentamycin, as isolated by the insoluble salt technique, may also be further purified by reprecipitation as an insoluble salt followed by regeneration.

The following examples illustrate suitable methods for preparing, purifying and characterizing gentamycin starting with the fermentation of M. purpurea or M. echinospora.

In some of the examples which follow, an assay value of the produced gentamycin (or a salt thereof) is expressed in terms of units per milligram as an indication of activity. The assay is effected microbiologically by a standard disc-type agar diffusion assay technique using Staphylococcus aureus (A.T.C.C. 6538P) as test organism. A reference curve is prepared by plotting the dosage-response of the antibiotic diluted in phosphate buffer at pH 8 in a medium consisting of:

| | Percent |
|---|---|
| Peptone | 0.6 |
| Pancreatic digest of casein | 0.4 |
| Yeast extract | 0.3 |
| Beef extract | 0.15 |
| Dextrose | 0.15 |
| Agar | 1.5 | in which the pH is adjusted to 8.0 with sodium hydroxide solution. A suspension of the assay organism (S. aureus) is standardized to provide 20% transmission at 600 m$\mu$ in a colorimeter. The potency of the sample is determined from the reference curve and expressed in terms of units per miligram (a unit being that amount of test substance required to produce an 18 mm. zone of inhibition with a 13.5 mm. disc).

Example 1

SHAKE FLASK FERMENTATION OF M. PURPUROA

Germination stage: Add a lyophilized culture of M. purpurea to a 300 ml. shake flask containing 100 ml. of the following sterile medium:

| | | |
|---|---|---|
| Bacto-beef extract | gm | 3 |
| Tryptose | gm | 5 |
| Dextrose | gm | 1 |
| Starch (soluble) | gm | 24 |
| Yeast extract | gm | 5 |
| Tap water | ml | 1000 |

Incubate the flask and its contents for 5 days at 37° C. on a rotary shaker (280 r.p.m., 2 inch. stroke).

Fermentation stage: Transfer a 25 ml. inoculum (from the germination stage) to each of four 2-liter flasks, each containing 500 ml. of the following medium:

| | | |
|---|---|---|
| Yeast extract | gm | 10 |
| Dextrose | gm | 10 |
| Calcium carbonate | gm | 1 |
| Tap water | ml | 1000 |

Incubate the flasks and their contents for 5 days at 26° C. on a rotary shaker. Pool the contents of the flasks. Acidify an aliquot of the whole broth to pH 2 with 6 N sulfuric acid and centrifuge. Collect the supernatent broth and neutralize with 6 N sodium hydroxide. The neutral broth aliquot is tested for activity against *Staphylococcus aureus* by agar diffusion technique. (Broths obtained as described assay at 15–20 units/ml. of antibiotic.)

Example 2
TANK FERMENTATION OF *M. PURPUREA*

Germination stage: Carry out the germination in the manner described in Example 1.

Inoculum preparation stage: Transfer a 25 ml. inoculum (from the germination stage) to each of four 2-liter flasks, each containing 500 ml. of the sterile medium utilized for germination. Incubate the flasks and contents for 5 days at 28° C. on a rotary shaker (280 r.p.m., 2″ stroke). Pool the contents of the flasks. Add a 25 ml. inoculum (taken from the pool) to each of twenty 2-liter flasks, each containing 500 ml. of the folowing sterile medium:

| | |
|---|---|
| Soybean meal gm | 30 |
| Dextrose (cerelose) gm | 40 |
| Calcium carbonate gm | 1 |
| Tap water ml | 1000 |

Incubate the flasks and their contents for 3–5 days at 28° C. on a rotary shaker (280 r.p.m., 2″ stroke). Pool and aseptically transfer the broth into a sterile inoculum flask having a side arm (total volume—about 10 liters).

Fermentation stage: Aseptically transfer the 10 liters of inoculum to a 65 gallon fermenter containing 50 gallons of the following sterile medium:

| | |
|---|---|
| Bacto-beef extract gm | 600 |
| Bacto-tryptose gm | 1000 |
| Dextrose (cerelose) gm | 200 |
| Starch (soluble) gm | 4800 |
| Yeast extract gm | 1000 |
| Anti-foamer GE-60 (General Electric Co. brand of a silicone defoamer), or other defoamer ml | 100 |
| Tap water, q.s. to liters | 200 |

Adjust pH to 6.9–7.0 before sterilization. Aerobically ferment for 20–30 hours (until the packed cell volume is about 10–15%) under the following conditions:

| | |
|---|---|
| Temperature | 37° C. |
| Sterile air input | 5.4 cubic feet/minute. |
| Pressure | 7 p.s.i. |
| Agitation | 180 r.p.m. |

Aseptically transfer the contents of the fermenter to a 675 gallon fermentation tank containing 450 gallons of sterile medium having the following composition:

| | |
|---|---|
| Yeast extract kg | 17 |
| Dextrose kg | 17 |
| Calcium carbonate kg | 1.7 |
| Anti-foam (GE-60) ml | 400 |
| Water q.s. to gal | 450 |

Ferment at 35° C. while agitating at 120 r.p.m. and introducing air at 7 p.s.i. and 15 cu. ft./min. for 24–31 hours.

At the end of this period, the potency of the produced antibiotic reaches a peak which remains substantially constant. During the fermentation the pH remains substantially in the range of 6.6 to 7.4. The packed cell volume reaches a constant value of 2–2.5 ml. The potency of the produced antibiotic is approximately 25 units/ml.

Example 3
EXTRACTION OF GENTAMYCIN FROM LABORATORY FERMENTATION

Adjust the pH of the whole broth from Example 1 (about 2 liters) to 2 with 6 N sulfuric acid. Stir and filter using a filter aid. Adjust the pH of the filtrate to 7.0 with 6 N sodium hydroxide. Pass the neutral broth through a cationic exchange resin column (IRC–50 Amberlite, 1–10 gms. resin/liter of broth). Discard the eluate. Elute the column with sulfuric acid at a pH of 2.0. Neutralize the eluate with 6 N sodium hydroxide to pH 7. Concentrate the solution in vacuo to about one-tenth volume. Adjust pH to 10.0 with 6 N sodium hydroxide solution and add 4 volumes of acetone while stirring. Chill the mixture and filter. Adjust the filtrate to pH 5.0 with 6 N sulfuric acid and concentrate in vacuo at room temperature (activity of concentrate approximates 20,000 units/ml.). Add 10 volumes of methanol while stirring and filter the precipitated sulfate of gentamycin. Dry in vacuo. Total yield: about 100 mg., assaying at 343 units/mg. by agar diffusion against *Staphylococcus aureus*.

Purification of gentamycin sulfate is effected as follows: Dissolve 15 g. of the crude salt (assaying at about 340–450 units/mg.) in 50 ml. of water. Pass through an anionic exchange resin (IRA–400, OH form) in a column 1.5″ x 24″. Wash column with 2 l. water. Concentrate the eluate to dryness in vacuo and dissolve the residue in 50 ml. of methanol. While stirring add the solution to 1 l. of acetone. Filter and wash the precipitate with acetone. (This precipitate consists substantially of co-produced antibiotics BA–3 (fraction A) and BA–3 (fraction B).) Evaporate the filtrate to dryness and take up in 50 ml. of methanol. Add the solution to 500 ml. ether while stirring. Filter and wash the precipitate with ether. Evaporate the filtrate to a residue consisting of purified gentamycin, about 3 grams, assay: 961 units/mg.

Example 4
ISOLATION OF GENTAMYCIN (AS SULFATE) FROM TANK FERMENTATION

Add 25 kg of filter-aid (Celite) to the 500 gal. of fermentation broth from Example 2, and filter. Suspend the filter-aid and the adhering mycelium in 100 gal. of water, adjust the pH to 2 with 6 N sulfuric acid and stir for 15 minutes. Filter and discard the mycelial cake. Adjust the pH of the filtrate to 7.0 by adding 4 N sodium hydroxide. Charge the neutralized filtrate to a cationic exchange adsorption column (IRC–50 Amberlite, in its sodium form, resin volume 18–20 liters). Discard the eluate, wash the resin with water and elute with 2 N sulfuric acid, pooling the acid eluates. Continue elution until pH of eluate is about 0.5. Neutralize the pooled eluates to a pH of about 7.5 with 2 N sodium hydroxide. Concentrate to about one gallon in vacuo at a temperature below 45° C. Render the concentrate to pH 10.5 with 2 N sodium hydroxide solution. Add 5 volumes of acetone, cool and filter, wash the precipitated salts with acetone and combine filtrate and washings. Adjust the pH of the combined filtrate to 4.5 with 2 N sulfuric acid, concentrate in vacuo below 45° C. to 100 ml. Add one liter of methanol, filter and discard filtrate. Dissolve the precipitate (crude gentamycin sulfate) in sufficient water (100 ml.) to make a 20% solution. Adjust pH to 10.5 with 2 N sodium hydroxide and add 5 volumes of acetone. Cool, filter and discard the precipitated salts. Adjust pH of filtrate to 4.5 with 2 N sulfuric acid, and concentrate in vacuo to 50 ml. Add 500 ml. of methanol, filter and wash precipitate with cold methanol. Dry the solid in vacuo over phosphorus pentoxide, to yield about 20–30 grams of crude gentamycin sulfate (activity: approximate 500 units/mg), which consists substantially of the sulfate of gentamycin in admixture with the sulfates of BA–3 (fraction A) and BA–3 (fraction B).

Alternatively, gentamycin is extracted and isolated as its sulfate as follows: Filter the broth from Example 2 and suspend the mycelium in 350 l. of water. While stirring, add 6 N sulfuric acid to adjust pH to 2. Filter and wash mycelium with water. Combine both filtrates and washings. Adjust pH to 6.5 with 4 N sodium hydroxide.

Add 2 kg. of diatomaceous earth filter-aid and 750 ml. of a 30% aqueous solution of Santomerse S (sodium dodecylbenzene sulfonate). Stir vigorously for 15 minutes, filter and wash the filter cake with water. Partially air-dry the filter cake and then suspend it in 40 l. of methanol. Stir for 10 minutes and filter. Extract the cake again with 40 l. of methanol and combine the methanolic extracts. Pass the methanol solution (about 100 l.) through an anionic exchange adsorption column (5.0 l. Amberlite 401 S in methanol; resin in hydroxy form). Wash column with 20 l. of methanol. Combine eluates and concentrate in vacuo to about 10 l. and filter. Adjust pH of filtrate to 7.0 with 2 N sulfuric acid concentrate to 400 ml. and filter. Adjust pH of filtrate to 4.5 with 2 N sulfuric acid and add 5–10 volumes of methanol. Filter the precipitated crude gentamycin sulfate, wash with methanol and dry at 40–60° C. in vacuo. Yield: About 56 g. (assay: 625 units/mg.).

*Example 5*

PURIFICATION OF GENTAMYCIN SULFATE FROM TANK FERMENTATION

Dissolve 55 g. of crude gentamycin sulfate (from Example 4) in 10 l. of water, adjust the pH to 6.5 with 2 N sodium hydroxide and add 300 g. of diatomaceous earth filter aid. While stirring add 250 ml. of a 30% aqueous solution of Santomerse S. Filter, wash the precipitate with water and air dry. Suspend the filter cake in 10 l. of methanol, stir and filter. Repeat the methanol extraction of the filter cake and combine the filtrates. Pass the filtrates through an anionic exchange column containing 5 l. of IRA–401 S resin (OH form) in methanol at a flow rate of about 500 ml./minute. Wash the column with 10 l. of methanol and combine the eluates. Concentrate the combined eluates in vacuo to 1 liter, add dilute sulfuric acid until precipitation is complete. Preferably, sulfuric acid is added to pH 4.5, then while stirring add 18 g. of activated pulverized charcoal and continue stirring for 15 minutes. Filter and wash the carbon cake with water. Combine the filtrate and washings and add to 10 volumes of methanol. Filter the thus formed gentamycin sulfate and dry. Yield: about 37 g.; assay: about 760 units/milligram.

*Example 6*

PREPARATION OF GENTAMYCIN FROM GENTAMYCIN SULFATE

Dissolve 10 g. of gentamycin sulfate (from Example 5) in 1500 ml. of water and pass the solution through an anionic exchange column containing 100 ml. of IRA–400 (OH form). Concentrate the eluate and lyophilize to yield about 6.7 g. of gentamycin, assay about 1120 units/milligram.

*Example 7*

PREPARATION OF GENTAMYCIN HYDROCHLORIDE

Dissolve 104 g. of gentamycin sulfate (from Example 5) in 1500 ml. of water, adsorb as described in Example 6 and adjust the eluate to pH to 4.5 with hydrochloric acid. Concentrate the solution to dryness in vacuo. Dissolve the residue in 125 ml. of methanol and add 750 ml. of acetone. Collect the precipitated gentamycin hydrochloride on a filter, wash with acetone and dry in vacuo at 40–60° C. Yield: about 8.9 g.; assay: about 820 units/milligram.

*Example 8*

PREPARATION OF GENTAMYCIN HELIANTHATE

Dissolve 6.4 g. of the crude gentamycin sulfate (obtained in Example 4) in 65 ml. of water. Add a hot solution (75° C.) of 32 g. of Methyl Orange in about 300–350 ml. of water. Stir and heat the mixture to 75° C. and filter hot. Wash the precipitated helianthate with water and dry in vacuo over phosphorus pentoxide. Recrystallize from hot aqueous methanol obtaining about 12.4 g. of reddish-brown needles, M.P. 265° C. (dec.). Analysis (approx.): C=52.74%, H=6.43%, N=13.61%, O=19.42%, S=7.64%.

The helianthate so formed from crude gentamycin sulfate may contain minor quantities of the co-produced antibiotics BA–3 (fraction A) and BA–3 (fraction B). However, the preparation of the helianthate in the above manner does represent a purification, since upon conversion to a hydrochloride a product is obtained having an assay of approximately 760 units/milligram. The helianthate is converted to hydrochloride by dissolving in 2 N hydrochloric acid, filtering through a bed of charcoal, concentrating the filtrate and adding six volumes of acetone. The hydrochloride is thereby precipitated and is separated by filtration and dried.

*Example 9*

PREPARATION OF GENTAMYCIN REINECKATE

Dissolve 2.2 g. of crude gentamycin sulfate (from Example 4) in 22 ml. of water. Add 82 ml. of a saturated aqueous Reinecke salt solution while stirring. Stir the mixture at room temperature for one hour and then allow to stand at about 5° C. overnight. Filter the precipitate, wash with ice water and dry in vacuo over phosphorus pentoxide. Recrystallize the Reineckate from hot aqueous methanol obtaining purple needles, M.P. 270° C. (dec.). Analysis: C=24.50%, H=4.49%, N=22.10%, S=27.92%, Cr=9.52%.

The Reineckate salt, as described above, may contain minor quantities of co-produced antibiotics but still may be utilized as a purification, since upon reconversion to sulfate a product is obtained having an assay of about 700 units/milligram. The Reineckate is transformed back to sulfate as follows: Dissolve the Reineckate in aqueous methanol, absorb onto a strongly basic anion exchange resin (Amberlite IRA–401 S), concentrate the eluate, adjust the pH to 4.5 with dilute sulfuric acid, add five volumes of methanol and filter the precipitated, purified gentamycin sulfate.

*Example 10*

SODIUM POLY-N-METHYLENE SULFONATE GENTAMYCIN

Dissolve 16.4 g. of gentamycin sulfate (from Example 5), in 108 ml. of water. Add 30 g. of sodium formaldehyde bisulfite in 100–200 mg. portions. Stir for 30 minutes, add triethylamine until the pH rises to 6.8 and continue stirring for 18 hours. Add the reaction mixture to 5 volumes of methanol and cool to 5° C. Filter and wash the precipitate with methanol and then with ether. Air dry. Yield: colorless amorphous powder.

A more elegant and higher grade product is obtainable as follows:

Dissolve 200 g. gentamycin sulfate in 1.3 l. of water. Add 366 g. of sodium formaldehyde bisulfite in small portions over a period of 20 minutes. Adjust the pH to 6.7 with 135 ml. triethylamine and stir for 16 hours at room temperature. Add the solution to 7.5 l. of methanol while agitating. Filter the precipitate and wash with methanol. Combine filtrate and methanol washes and add to 9.8 l. of acetone while stirring. Filter the precipitate, wash with acetone and dry. Yield: 178 g. amorphous, white powder; activity 580 $\mu$/mg. Analysis: C, 26.44%; H, 6.18%; N, 5.54%; S, 14.66%; Na, 7.49%; ash 22.2%.

CHEMICAL AND PHYSICAL PROPERTIES OF GENTAMYCIN

Gentamycin, as produced, is a white amorphous powder having the following physical and chemical characteristics:

I. Melting point: (Koeffler block) softening at 102° C., complete melt at 108° C.

II. Analysis:
 (a) Elementary—
  C=50.20%
  H=9.52%
  N=13.47%
  O=27.81% (by difference)
  No other elements are present.
 (b) Qualitative/quantitative—
  1. No methoxy groups
  2. N-methyl groups=2.75%
  3. C-methyl groups=2.97%
  4. Van Slyke N=10.18%
  5. Ninhydrin test—positive
  6. Elson-Morgan test (amino sugars)—positive
  7. Maltol reaction test—negative (no maltol formation after heating with alkali)
  8. Furfural test—negative (no volatile ultraviolet absorbing products formed after heating with 40% aqueous sulfuric acid at 100° C.)
  9. Sakaguchi test (for quanidines)—negative III. Molecular weight—543 (ebullioscopic in methanol).

IV. Calculated molecular weight=545 (based on assumption of one N-methyl group per molecule).

V. Rotation $[\alpha]_D^{25}=+146°$ (1% in water).

VI. Solubility: Extremely soluble in water. Soluble in polar media such as pyridine and dimethylformamide. Soluble in acidia media with salt formation. Moderately soluble in methanol, ethanol and acetone. Insoluble in ether, benzene, halogenated hydrocarbons.

VII. Ultraviolet spectrum: Completely transparent in the range 220–400 m$\mu$.

VIII. Infra red spectrum: (See FIGURE 1 of the drawings for spectrum in mineral oil)—(Nujol). The absorption peaks (W=weak, M=moderate, M-S=moderate to strong, S=strong, V-S=very strong, sh=shoulder) are located at the following wave-lengths:

| ($\mu$) | Peak strength |
|---|---|
| 3.00 | M-S |
| 3.10 | sh |
| 3.25 | sh |
| 3.42 | S |
| 4.30 | W |
| 6.35 | M |
| 6.85 | S |
| 7.25 | M-S |
| 7.50 | sh (broad) |
| 7.80 | sh |
| 8.77 | W |
| 9.06 | M (broad) |
| 9.52 | S |
| 9.78 | S |
| 10.45 | M-S |
| 11.58 | W |

IX. Salt formation: Gentamycin, being a moderately strong base forms salts with any strong organic or inorganic acids. The salts of strong inorganic acids are extremely water soluble.

A. Hydrochloride—
  Melting point: 194–209° C. (dec.)
  Rotation $[\alpha]_D^{25}+113°$ (1% in water)
  Elemental analysis:
   C=35.47%
   H=7.27%
   N=9.69%
   O=22.46%
   Cl=24.90%
  Antibiotic activity=820 units/mg.
  Solubility—very soluble in water and methanol, slightly soluble in ethanol, insoluble in other common organic solvents.
  Infra red spectrum (Nujol)—(see FIGURE 2 of the drawings)

| $\lambda(\mu)$ | Peak strength |
|---|---|
| 3.00 | S |
| 3.80 | sh |
| 4.95 | W |
| 6.25 | M-S |
| 6.65 | sh |
| 7.45 | sh |
| 8.95 | S |
| 9.65 | V-S |

B. Sulfate—
  Melting point: 218–237° C. (dec.)
  Elemental analysis:
   C=31.22%
   H=6.57%
   N=8.46%
   O=41.63%
   SO$_4$=31.22%
  Rotation: $[\alpha]_D^{25}=+102$ (1% in water)
  Antibiotic activity=800 units/mg.
  Infra red spectrum (Nujol)—(see FIGURE 3 of the drawings)

| ($\mu$) | Peak strength |
|---|---|
| 2.95–3.25 | S (broad) |
| 3.45 | VS |
| 4.27 | sh |
| 4.80 | W (broad) |
| 6.14 | MS |
| 6.55 | MS |
| 6.86 | S |
| 7.26 | S |
| 7.45 | sh |
| 7.77 | W |
| 8.70–9.75 | VS (broad) |
| 10.27 | M |
| 11.38 | W (broad) |
| 13.88 | M |

C. *Other salts*—Gentamycin is convertible into insoluble or slightly soluble acid addition salts by the action of the appropriate acid (or soluble salt thereof) in aqueous media. Where the acid anion is pharmaceutically acceptable, the salt formed with gentamycin becomes suitable for incorporation in an aqueous or oil suspension formulation. Such preparations, administered parenterally, provide depot effects with slow release of the antibiotic. In general, the fatty acids having eight or more carbon atoms provide such salts of gentamycin wherein the solubility has been reduced. Representative of such acids are lauric, stearic, palmitic, oleic and the like. Indeed, other acids behave in a similar fashion in providing salts with gentamycin wherein its hydrophilic properties are counteracted upon by a hydrophobic component provided by the acid anion. Other types of acids which may be employed are aralkanoic acids (phenylbutyric), arylcarboxylic (naphthalene-1-carboxylic acid), sulfuric and sulfonic acids (laurylsulfuric, dodecylbenzenesulfonic), others such as cholic, Fernholz, and related spices like tannic acid.

X. Miscellaneous properties:
(1) No reaction with 1.8 N methanolic hydrogen chloride at reflux after two hours; quantitative recovery of starting material.
(2) Antibiotic activity of gentamycin completely destroyed by hydrolysis with 6 N hydrochloric acid at 140° C. in 15 minutes. With 2 N hydrochloric acid at 100° C., 7 hours reaction time necessary to completely destroy activity.
(3) Stability—The activity of gentamycin is not significantly altered when an aqueous solution of the antibiotic is subjected to a temperature of 100° C. for 30 minutes throughout the pH range of 2 through 12.
(4) Other derivatives—Gentamycin like other antibiotics having primary amino groups, is transformed into N-methylenesulfonic acid derivatives by the action of sodium formaldehyde bisulfite (preferably upon gentamycin sulfate). The extent of conversion of the primary amino groups of gentamycin to the N-methylenesulfonic acid derivative is governed by the amount of formaldehyde-sodium bisulfite addition compound used in the reaction. The pH of the medium from which the product is isolated determines whether the product is a methane sulfonic acid or a salt thereof. Other analogous sulfonate derivatives are prepared by the action upon gentamycin of the addition compound of an alkyl or aryl ketone or aldehyde with bisulfite. These derivatives exhibit altered therapeutic indices as compared with the parent antibiotic. The derivative of gentamycin wherein all the primary amino groups appear to have been converted to their respective N-methylenesulfonic acids is prepared as in Example 10. The properties of this derivative are as follows: Soluble in water, insoluble in methanol, $[\alpha]_D^{25} + 49.7$ (1% in water), infra-red absorption bands at $2.90\mu$ (S), $608\mu$ (MS), $6.50\mu$ (sh), $8.72\mu$ (V–S) and $9.62\mu$ (S).

XI. Paper chromatographic properties: Gentamycin, as determined by paper chromatograms, is different from other basic antibiotics. In obtaining the chromatogram, an ascending system is employed with the Rƒ value being the ratio of the distance traversed by the antibiotic in relation to the distance traversed by the solvent front. Table VI sets forth the comparative Rƒ values (these values connected by a hyphen indicate a streak while those unconnected indicate separate and discrete spots).

*Table VI*

COMPARISON OF Rƒ VALUES OF GENTAMYCIN IN VARIOUS SYSTEMS WITH OTHER ANTIBIOTICS

| Antibiotic | System [1] and Rƒ value | | | | | | |
|---|---|---|---|---|---|---|---|
| | A | B | C | D | E | F | G |
| Gentamycin | 0.59 | 0.26 | 0.1 | 0.3 | 0.45 | 0-0-0.25 | 0.0-0.48 |
| Neomycin | 0.22 | 0.12 | 0.29 | 0.0 | 0.05-0.20 | 0.0-0.13 | 0.0-0.50 |
| Kanamycin | 0.30 | 0.18 | 0.25 | 0.0-0.35 | 0.15-0.25 | 0.02 | 0.76 |
| Neamine | 0.30 | | | | 0.30 | 0.05 | 0.75 |
| Streptomycin | 0.57 | 0.40 | 0.21 | 0.06 | 0.03-0.19 | 0.0 | 0.0-0.33 |
| Streptothricin | 0.36 | 0.30 | 0.27 | 0.27 | 0.09 | 0.0 | 0.18 |
| Paromomycin | 0.33 | 0.11 | 0.38 | 0.0 | 0.03-0.29 | 0.03 | 0.25 |
| Viomycin | 0.27 | 0.19 | 0.51 | | 0-0.25 | 0.0 | 0.43-0.65 |
| Dihydrostreptomycin | 0.53 | 0.36 | 0.18-0.45 | | 0.03-0.3 | 0.0 | 0.22 |

[1] Systems: A. 80% methanol (in water) + 3% NaCl, using paper buffered to pH 2.3 with sulfate-bisulfate. B. Propanol-pyridine-acetic acid-water (15:10:3:12). C. Propanol-water-acetic acid (50:40:5). D. 80% aqueous phenol. E. n-Butanol saturated with water containing 2% p-toluene sulfonic acid. F. Butanol-water (84:16)+ 2% piperidine. G. Water-butanol (94:6)+0.25% p-toluenesulfonic acid.

XII. Antibiotic activity: The antibiotic activity of gentamycin is 1120 units/mg.

BIOLOGICAL PROPERTIES OF GENTAMYCIN

Gentamycin possesses a broad anti-bacterial and anti-rickettsial spectrum. Gentamycin is a useful anti-infective agent capable of effectively inhibiting certain disease manifestations caused by Staphylococcus aureus, Klebsiella pneumoniae and other pathogenic organisms. It is also useful in treating mastitis in cattle.

It is particularly effective in combatting urinary tract infections caused by gram-negative organisms such as species of Proteus and Psedomonas. It is known that the number of hospital infections due to gram-negative organisms is increasing. Gentamycin appears particularly useful in treating such chronic gram-negative infections of the kidney and bladder even in refractory patients. The high antibiotic activity of gentamycin against Proteus and Pseudomonas infections easily permits clinical utilization. As a particular example of such effect, gentamycin has been successfully employed in treating a chronic Pseudomonas kidney infection at a dose of 1 mg./kg. administered three times daily. This infection which did not respond well to other therapy was completely eliminated from the urine after one day of treatment and did not recur even after 10 days. Similar responses have been elicited against several Proteus infections. It thus appears that gentamycin possesses an advantageous combination of unique types of activity in conjunction with low toxicity permitting its use in preference to other antibiotics.

The comparative in vitro activity of gentamycin against a variety of gram-positive, gram-negative and acid fast organisms is set forth in Tables VIIA and VIIB which follow. The susceptability of the microorganism to the antibiotic was determined by the standard tube dilution methods. In each instance $10^{-5}$ dilutions of 24-hour broth cultures were employed as inoculum with the end points taken after incubation for 24 hours at 37° C. Except where indicated the growth medium consisted of a brain-heart infusion broth (Difco). In the tables, the sulfates of the particular antibiotics were utilized in the tests against the microorganisms enumerated therein. The minimal inhibitory concentrations are expressed, however, in terms of the pure base antibiotic.

Table VIIA

| Microorganism | | Gentamycin | Kanamycin | Neomycin |
|---|---|---|---|---|
| | | Minimal inhibiting concentration (mcg./ml.) | | |
| GRAM POSITIVE | | | | |
| Bacillus cereus var. mycoides | DA 30 [1] | 0.5 | 8.0 | 0.5 |
| Bacillus cereus var. mycoides | DA 34 | 0.5 | 1.5 | 0.5 |
| Bacillus cereus var. mycoides | ATCC 7064 | 0.75 | 3.0 | 2.0 |
| Bacillus megatherium | DA 31 | 0.075 | 0.25 | 0.075 |
| Bacillus subtilis | ATCC 6633 | 0.015 | 0.035 | 0.015 |
| Bacillus sphaericus | DA 32 | [2] 0.1 | 0.75 | 0.25 |
| Bacillus sphaericus | DA 33 | [3] 0.05 | 0.75 | 0.075 |
| Brucella abortus | DA 70 | 0.25 | 0.75 | 0.5 |
| Staphylococcus aureus | ATCC 6538P | 0.075 | 0.75 | 0.1 |
| Staphylococcus aureus | ATCC 12715 | 0.035 | 0.5 | 0.035 |
| Staphylococcus aureus | ATCC 6538 | 0.175 | 0.75 | 0.375 |
| Staphylococcus aureus | ATCC 9996 | 0.25 | 1.5 | 0.75 |
| Staphylococcus aureus | ATCC 1163 | 0.175 | 0.75 | 0.375 |
| Staphylococcus aureus | Gray | 0.375 | 1.5 | 0.25 |
| Staphylococcus aureus | Smith | 0.25 | 0.75 | 0.375 |
| Staphylococcus aureus | DA 40 | 0.25 | 1.5 | 0.25 |
| Staphylococcus epidermidis | DA 41 | 0.375 | 0.25 | 0.25 |
| Sarcina lutea | ATCC 9341A | 0.25 | 0.75 | 0.25 |
| Sarcina lutea | ATCC 9341 | 0.25 | 3.0 | 0.25 |
| Streptococcus pyogenes | DA 21 | [3] 6.0 | 32.0 | 16.0 |
| Streptococcus fecalis | DA 20 | 12.0 | >100.0 | 16.0 |
| Streptococcus fecalis | ATCC 10541 | 12.0 | >100.0 | 48.0 |
| Micrococcus flavus | DA 60 | 0.075 | 6.0 | 0.75 |
| Corynebacterium simplex | DA 80 | [2] 0.5 | | 0.25 |

[1] DA refers to Schering Corporation Collection number.
[2] 1% yeast extract, 1% dextrose medium.
[3] 5% human serum added.

Table VIIB

| Microorganism | | Gentamycin | Kanamycin | Neomycin |
|---|---|---|---|---|
| | | Minimal inhibiting concentration (mcg./ml.) | | |
| GRAM NEGATIVE | | | | |
| Aerobacter aerogenes | DA 90 [1] | 0.75 | 94.0 | 24.0 |
| Aeromonas salmonicida | DA 100 | 0.25 | 3.0 | 0.25 |
| Alcaligenes sp | ATCC 10153 | 0.025 | 0.5 | 0.75 |
| Alcaligenes facalis | ATCC 8750 | 1.5 | 3.0 | 1.5 |
| Escherichia coli | DA 110 | 1.25 | 12.0 | 3.0 |
| Escherichia coli | ATCC 10586 | 1.5 | 12.0 | 6.0 |
| Escherichia intermedia | DA 111 | 0.375 | 1.5 | 1.5 |
| Klebsiella pneumoniae | DA 1 | 0.35 | 0.75 | 0.375 |
| Proteus hydrophila | DA 120 | 0.5 | 12.0 | 12.0 |
| Proteus vulgaris | DA 121 | 6.0 | 16.0 | 12.0 |
| Pseudomonas aeruginosa | ATCC 10197 | 0.1 | 0.25 | 0.25 |
| Pseudomonas aeruginosa | ATCC 9027 | 0.25 | 12.0 | 1.5 |
| Pseudomonas aeruginosa | ATCC 9721 | 0.25 | 6.0 | 1.0 |
| Pseudomonas aeruginosa | ATCC 10145 | 0.25 | 12.0 | 3.0 |
| Pseudomonas aeruginosa | ATCC 8709 | 0.25 | 12.0 | 1.5 |
| Salmonella schottmuelleri | DA 10 | 1.5 | 12.0 | 1.5 |
| Salmonella typhimurium | DA 11 | 6.0 | 12.0 | 12.0 |
| Salmonella typhimurium | ATCC 9187 | 3.0 | 12.0 | 12.0 |
| ACID FAST | | | | |
| Mycobacterium smegmatis | DA 150 | [2] 0.15 | | |
| Mycobacterium tuberculosis | H 37RV | [3] 0.20 | | |

[1] DA refers to Schering Corporation Collection number.
[2] Yeast-beef broth (Difco).
[3] Dubos: Medium plus tween 80.

The in vivo activity against certain bacterial infections in mice has been tested. The mice were infected with an inoculum of the particular bacteria administered by intraperitoneal injection. They were then treated by subcutaneous injections of gentamycin sulfate (724 units/mg.) dissolved in water, said injection administered in two divided dosages. The protecting dose for varying percentages of injected animals was determined as shown in the following Table VIII.

Table VIII

| Infecting microorganism | Dosage gentamycin mcg./mouse/day | Percentage survival |
|---|---|---|
| Klebsiella pneumoniae | [1] 0 | 0 |
| | 20 | 20 |
| | 30 | 50 |
| | 40 | 80 |
| | 50 | 100 |
| Staphylococcus aureus (gray) | 40 | 40 |
| | 60 | 50 |
| | 80 | 100 |
| Salmonella schottmuelleri | 80 | 50 |

[1] Control saline solution.

The acute toxicity of gentamycin in mice has been determined in the standard manner by a variety of routes. Utilizing gentamycin sulfate (724 units/mg.) in mice weighing 18–20 grams, the following data was obtained.

Mode of administration:                   LD/50 (mg./kg.)
  Subcutaneous _____ 675
  Intraperitoneal _____ 550
  Intravenous _____ 75
  Oral _____ >10,000

Gentamycin exhibits in vivo antiviral activity against *Rickettsia akari*, groups of 6-day old embryonated eggs were each infected with 50 $LD_{50}$ doses of *R. akari*. A single dose of 3.0 mg. of gentamycin administered 3 hours prior to infection gave a 50% protection ($PD_{50}$). A 20% protection was obtained when treatment with gentamycin commenced 2 hours after infection.

In mice infected intracerebrally with approximately 450 $LD_{50}$ doses of *R. akari*, 100% protection was afforded by 5 mg. of gentamycin administered subcutaneously 4 hours prior to infection and continued for 4 days at 5 mg. per day in two divided daily doses. When treatment with gentamycin was delayed 48 hours after intracerebral infection, 100% protection was still obtained by subcutaneous administration of 10 mg. per day (2 doses of 5 mg. each) for five days.

Gentamycin and its salts exhibit a therapeutic effect when tested in mice against the H 37 RV strain of *Mycobacterium tuberculosis*.

THE CO-PRODUCED ANTIBIOTICS

As indicated in the introduction to this specification and in the first paragraph of the section entitled "The Antibiotic," the fermentation of *M. purpurea* or *M. echinospora* produces a number of antibiotic substances of which gentamycin represents the major component. The co-produced antibiotic substances comprise essentially two fractions identified as BA-3 (fraction A) and BA-3 (fraction B).

BA-3 (fraction A) and BA-3 (fraction B) are readily separable from gentamycin by the isolation and purification methods described heretofore for gentamycin. Fraction A and fraction B have been separated from each other by paper chromatographic methods described below. The two fractions, together, are separated from gentamycin according to the procedure described in Example 3. Advantage is taken of the greater solubility of gentamycin in acetone-methanol mixture as compared with BA-3 (fraction A) and BA-3 (fraction B). Upon the addition of acetone as described in Example 3 to a concentrated methanolic solution of gentamycin plus the two co-produced fractions, precipitation of the latter occurs. After washing with acetone, the precipitate is dried and consists essentially of a mixture of the two fractions A and B.

An alternate method for isolating these A and B fractions is one which takes advantage of the greater solubility of their dodecylbenzene sulfonate salts as compared with gentamycin. According to Example 5, the dodecylbenzene sulfonate (Santomerse S) salt of gentamycin is precipitated by the addition of a solution of Santomerse S to a solution of crude gentamycin sulfate. After filtering and washing the filter cake, as described in Example 5, the filtrates are now combined and represent a solution of the dodecylbenzene sulfonate salts of BA-3 (fraction A) and BA-3 (fraction B). The filtrate is passed through a column of a freshly regenerated anionic exchange resin (preferably Amberlite IRA-401 S OH form). The eluate is concentrated to 150 ml. and added dropwise to 10 volumes of acetone while stirring whereupon salts are precipitated, washed with acetone, and discarded. The combined filtrate is concentrated so as to eliminate acetone, resulting in an aqueous solution of BA-3 (fraction A) and BA-3 (fraction B). The solution is adjusted to pH 4.0 with 2 N sulfuric acid and filtered. There is added ten volumes of methanol and the resulting precipitate is filtered, washed with methanol, and dried. The dried amorphous material consists essentially of the sulfates of BA-3 (fraction A) and BA-3 (fraction B).

The mixture of fractions A and B as obtained above exhibit the following chemical, physical, and biological properties.

(1) Sulfate: white amorphous powder, soluble in water, insoluble in ethanol, methanol, acetone and other common organic solvents.
(2) Solubility: similar to that of gentamycin.
(3) Elemental content: C, H, N, O; no other elements present.
(4) Qualitative tests:
   a. Ninhydrin—positive
   b. Elson Morgan—positive
   c. Maltol—negative
   d. Furfural—negative
   e. Sakaguchi—negative
   f. Methoxy groups—none (5) Ultra violet spectrum—Transparent in range 220–400 mu.
(6) Paper chromatograph, $R_F$ values—This mixture exhibits the same $R_F$ values as gnetamycin in systems A, B, C, D, F and G as set forth in Table VI. In system E, i.e. n-butanol saturated with water containing 2% p-toluene sulfuric acid, a resolution is observed with BA-3 (fraction A) exhibiting an $R_F$ value of 0.15 and BA-3 (fraction B) exhibiting an $R_F$ value of 0.23.
(7) Antibiotic spectrum—Utilizing the mixture in solution assaying at 10 units/ml. (based upon gentamycin assay method) activity is demonstratable against *Staphylococcus aureus*, *Streptococcus fecalis*, *Bacillus subtilis*, *Escherichia coli*, *Salmonella schottmuelleri*, *Pseudomonas aeruginosa*, and *Klebsiella pneumoniae*. The mixture appears to be inactive against *Rickettsia akari* in mice at 10 mg./daily dose.
(8) Antibiotic activity (in relation to gentamycin)—About 200 units/milligram.

This application is a continuation-in-part of our co-pending applications Serial No. 152,262, filed November 14, 1961, and Serial No. 198,414, filed May 23, 1962, both now abandoned.

We claim:
1. A method which comprises cultivating a microorganism of the group consisting of *Micromonospora purpurea* and *Micromonospora echinospora* in an aqueous nutrient medium under areobic conditions until a composition of matter having substantial antibiotic activity is produced.
2. A method according to claim 1, wherein the organism is *Micromonospora purpurea* NRRL 2953.
3. A method according to claim 1, wherein the organism is *Micromonospora echinospora* NRRL 2985.
4. A method according to claim 1, wherein the organism is *Micromonospora echinospora* var. *ferruginea* NRRL 2995.
5. A method according to claim 1, wherein the organism is *Microsmonospora echinospora* var. *pallida* NRRL 2996.
6. A method for producing gentamycin which comprises cultivating a microorganism of the group consisting of *Micromonospora purpurea* and *Micromonospora echinospora* in an aqueous nutrient medium under aerobic conditions until a composition of matter having substantial antibiotic activity is produced and recovering gentamycin therefrom.
7. A method for producing gentamycin which comprises cultivating a member of the group consisting of *Micromonospora purpurea* and *Micromonospora echinospora* in an aqueous nutrient medium under aerobic conditions until a composition of matter having substantial antibiotic activity is produced, separating the mycelium from said medium, acid-extracting the mycelium and isolating gentamycin from the acid extract containing co-produced antibiotic substances by separation techniques of the group consisting of adsorption, fractional precipitation of salts and combinations thereof.
8. The method of claim 7 including the step of obtaining the co-produced antibiotics in solid form.
9. A composition of matter effective in inhibiting the growth of gram-positive, gram-negative and acid-fast bacteria, selected from the group consisting of gentamycin and salts thereof, said gentamycin being a basic organic substance having the following elementary analysis: C=50.20%, H=8.52%, N=13.47%, O=27.81%, with no other elements present, that has a specific optical rotation as measured by the D line of sodium at 25° C. of 146° in water at 1% concentration, is very soluble in water aqueous acidic media, methanol, and acetone and substantially insoluble in ether, benzene and halogenated hydrocarbons; is transparent to ultra-violet light in the range of 220–400 millimicrons; has an infrared absorption spectrum when suspended in hydrocarbon oil in solid form substantially as shown in FIGURE 1; has a melting point of about 102°–108° C. with decomposition; has a molecular weight of about 543 as determined ebullioscopically in methanol; and has an antibacterial spectrum including the bacteria enumerated in Tables VIIA and VIIB.

10. Gentamycin, as defined in claim 9.

11. A salt of gentamycin, said gentamycin as defined in claim 9.

12. A sulfate of gentamycin, said gentamycin as defined in claim 9.

13. A hydrochloride of gentamycin, said gentamycin as defined in claim 9.

14. An N-methylenesulfonate of gentamycin, said gentamycin as defined in claim 9.

References Cited in the file of this patent

Tomotsune et al.: J. Antibiotecs (Japan) 5, 187 (1952).

UNITED STATES PATENT OFFICE
CERTIFICATE OF CORRECTION

Patent No. 3,091,572                                      May 28, 1963

George M. Luedemann et al.

It is hereby certified that error appears in the above numbered patent requiring correction and that the said Letters Patent should read as corrected below.

Column 13, line 8, for "H=9.52%" read -- H=8.52% --; column 14, line 7 to 19, for

| $\lambda(\mu)$ | Peak Strength |
|---|---|
| 3.00 | S |
| 3.80 | sh |
| 4.95 | W |
| 6.25 | M-S |
| 6.65 | sh |
| 7.45 | sh |
| 8.95 | S |
| 9.65 | V-S | read

| $\lambda(\mu)$ | Peak Strength |
|---|---|
| 3.00 | M-S |
| 3.45 | S |
| 4.27 | sh |
| 4.95 | W |
| 6.27 | M-S |
| 6.64 | sh |
| 6.85 | S |
| 7.27 | S |
| 7.58 | W |
| 7.95 | sh |
| 8.27 | W |
| 8.95 | W (broad) |
| 9.20 | M (broad) |
| 10.25 | sh (broad) |
| 10.98 | W |
| 11.49 | W (broad) |
| 13.90 | M |

Signed and sealed this 19th day of January 1965.

(SEAL)
Attest:
ERNEST W. SWIDER
Attesting Officer

EDWARD J. BRENNER
Commissioner of Patents